Aug. 14, 1962   W. B. STUHLER   3,049,016
LINKAGE MECHANISM FOR A RECIPROCATING
SYMMETRICAL OUTPUT MOTION
Filed April 10, 1961   2 Sheets-Sheet 1

INVENTOR.
WILLIAM B. STUHLER
BY Moody and Antrim

AGENTS

INVENTOR.
WILLIAM B. STUHLER
BY Moody and Antrim

AGENTS

3,049,016
LINKAGE MECHANISM FOR A RECIPROCATING SYMMETRICAL OUTPUT MOTION

William B. Stuhler, Garland, Tex., assignor to Collins Radio Company, Cedar Rapids, Iowa, a corporation of Iowa
Filed Apr. 10, 1961, Ser. No. 101,735
3 Claims. (Cl. 74—43)

This invention pertains to driving linkages that convert rotary motion to reciprocating motion and particularly to driving linkages of reduced dimensions that provide relatively constant reciprocating motion over most of their travel, the motion being symmetrical relative to the quadrants of travel of their respective rotary driving cranks. Compact mechanical linkages according to the present invention may be substituted for four-bar linkages which have connecting rods that are extremely long compared with the length of either one of their cranks in order to obtain reciprocal motion that is constant in velocity over much of the travel of the follower crank.

Four-bar mechanical linkages have been used to reciprocate radar antennas through wide arcs. Unless the connecting rods of the linkages are extremely long, the velocity of the antennas varies noticeably throughout their ranges of travel and the rates of travel at corresponding points from the centers of travel to the outside limits are not the inversions of the rates of travel from the limits back to the centers. This variation in velocity for one direction of travel with respect to the other direction is a result of the different angles of the connecting rods for the same points but for different directions of travel of the reciprocating follower cranks.

According to the present invention, an additional follower element cooperates with a driving crank and a follower crank to maintain the angle of the connecting member of the linkage constant relative to the cranks for corresponding points regardless of the direction of travel of the reciprocating follower crank. Incidentally, the connecting member is maintained parallel to the fixed bar or mounting to which are mounted the rotary input shaft and the reciprocating output shaft. The nearly constant and symmetrical motion that is obtained compares favorably with that which is obtained by a four-bar linkage which has an infinitely long connecting rod for coupling the driving crank to the follower crank.

An object of the present invention is to provide compact mechanical linkages for converting a rotary motion to a reciprocating motion which has symmetrical velocity characteristics in the four quadrants of travel.

Another object is to maintain the velocity of the reciprocating output nearly constant except near the ends of its range of travel.

A feature of the invention is the utilization of components which are easily machined and which provide smooth accurate operation with a minimum of wear.

The following description and the appended claims may be more readily understood with reference to the accompanying drawings in which:

Figure 1:
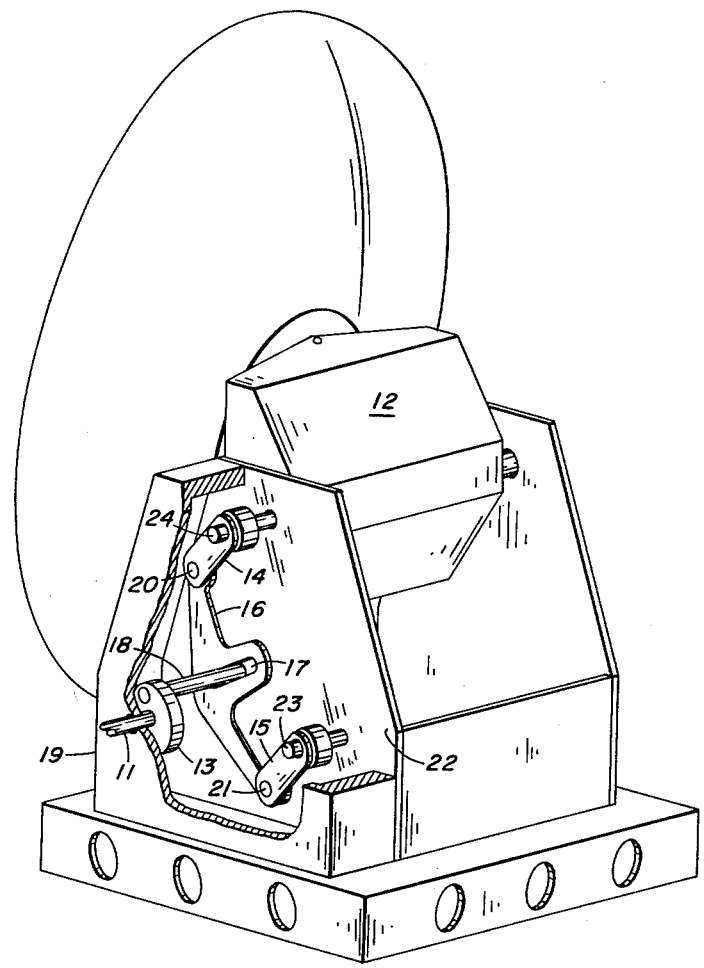
FIGURE 1 shows an oblique view of a mechanical linkage of this invention as applied to the scanning mechanism of a radar antenna.
Figure 2:
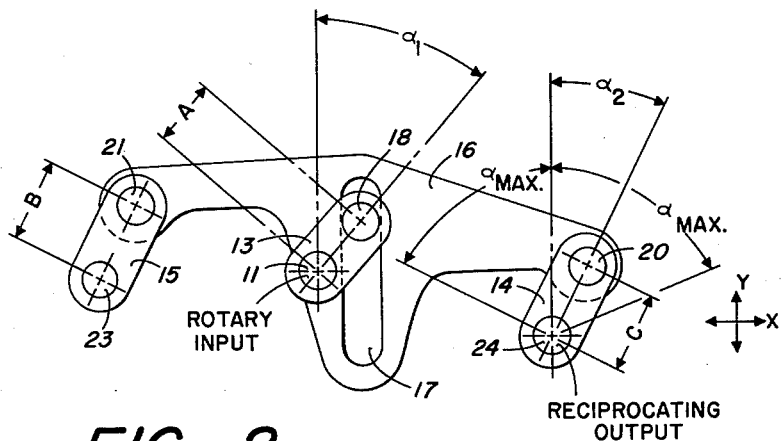
FIGURE 2 is a plane view of the mechanical linkage shown in FIGURE 1.

A mechanical linkage having an idle follower crank for controlling the direction of the connecting member as required for symmetrical operation is shown in FIGURES 1 and 2. In FIGURE 1 a constant rotary motion is applied to the input shaft 11 which is connected to the mechanical linkage for converting the rotary motion to suitable reciprocating motion for scanning the antenna assembly 12. The linkage comprises driving crank 13, output follower crank 14, and idle follower crank 15 which are coupled by the connecting member 16. The effective lengths, B and C, of the idle follower crank and of the output follower crank respectively are the same; the effective length A of the driving crank is somewhat shorter. The connecting member has two similar coupling arms which extend oppositely from a central driving portion which has a central transverse driving slot 17. The driving crank 13 is secured to input shaft 11 which is journaled in the mounting frame 19. A driving pin 18 extends from the crank 13 and engages the slot 17 of the connecting member. The pin 18 is a sliding fit in the slot 17 so that the pin is free to move transversely relative to the connecting member as the member is being driven by the driving crank. The opposite ends of the connecting member 16 are rotatably coupled to the output follower crank 14 and the idle follower crank 15 by coupling pins 20 and 21 respectively. The idle follower crank 15 is rotatably mounted by its shaft 23 to mounting plate 22 of the antenna assembly. The output follower crank 14 is secured to the antenna drive shaft 24. The shaft 24 is journaled in the plate 22 and extends through the plate where it is secured to antenna assembly 12 which is driven in a reciprocating motion about the shaft.

Figure 3:
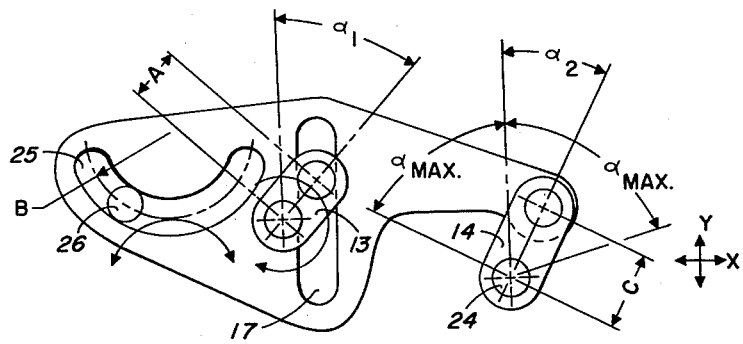
FIGURE 3 is a plane view of an embodiment having a different follower arrangement than that shown in FIGURES 1 and 2 for maintaining the connecting element at a constant angle.

The linkage illustrated in FIGURE 3 differs from that of FIGURE 2 in that it has an arcuate slot 25 and a guide pin 26 in place of the idle follower crank 15. The effective radius of the arcuate slot for positioning the connecting member is equal to the effective length of the output follower crank.

In operation, driving crank 13 is rotated at a constant velocity to move the connecting member 16 horizontally in the direction parallel with a line drawn between the shafts of the follower cranks. The horizontal displacement of the connecting member from a center position is equal to the effective length A of the input driving crank times the sine $\alpha_1$, $\alpha_1$ being the angle between a vertical line and a line drawn between the center of the shaft and the center of the pin of the driving crank. The vertical displacement of the connecting member from that position which it has when the output follower crank is centered is $C(1-\cos \alpha_2)$, C being the effective length of the output follower crank and $\alpha_2$ being the angle between a vertical line and a line drawn between the center of the shaft and the center of the pin of the follower crank.

In a typical application the ratio of the length A of the driving crank to the length C of the follower crank is such that the maximum angle of $\alpha_2$ is 60°. The velocity of the output shaft does not fall below eighty percent of the maximum velocity as $\alpha_2$ varies from minus 45° to plus 45°. When the output shaft is displaced 50° from its center position, the velocity is still more than three-fourths the maximum velocity.

When the ratio of the length of the driving crank to the length of the follower crank approaches one so that the angle $\alpha_2$ approaches a maximum angle of 90°, the velocity of the output shaft approaches linearity and the stresses on the linkage at the time of reversal of the output shaft approach infinity. The limit of the maximum angle of rotation of the follower crank is therefore determined by the allowable stresses according to the resistance and mass of an output load.

Although this invention has been described with respect to particular embodiments thereof, it is not to be so limited, as changes and modifications may be made therein which are within the spirit and scope of the invention as defined by the appended claims.

I claim:

1. A rocker and crank mechanical linkage for providing symmetrical reciprocating output motion for each quadrant of rotary input motion comprising, a rotary driving crank to which the input is applied, a reciprocating output follower crank, first and second parallel shafts spaced a moderate distance apart, each of said cranks being rotatably mounted on a respective one of said shafts, a connecting member having a transverse slot, said driving crank having a crankpin slidingly engaging said slot of said connecting member, said output follower crank having a crankpin rotatably coupled to said connecting member, the effective length of said driving crank being less than that of said output follower crank, guiding means coupled to said connecting member, said guiding means cooperating with said output follower crank to define the locus of reciprocating rotation of said connecting member for maintaining the direction of said connecting member constant at corresponding positions of said follower crank during different quadratures of rotation of said driving crank.

2. A mechanical linkage as claimed in claim 1 in which said guiding means comprises, a second follower crank, a third shaft parallel to said first and second shafts and spaced apart therefrom, said second follower crank being rotatably mounted on said third shaft, the effective lengths of said follower cranks being equal, and said second follower crank having a crankpin rotatably coupled to said connecting member.

3. A mechanical linkage as claimed in claim 1 in which said guiding means comprises, an arcuate slot in said guiding member, said arcuate slot having a radius equal to the effective length of said output follower crank, the axis of said arcuate slot being parallel to said shafts, the angle subtended by said arcuate slot being at least as large as the angle of movement of said output follower crank about its axis, and a guide pin fixed relative to said shafts for slidingly engaging said arcuate slot throughout the travel of said connecting member as determined by the operation of said cranks.

References Cited in the file of this patent
UNITED STATES PATENTS

| | | |
|---|---|---|
| 166,047 | Whipple | July 27, 1875 |
| 2,942,459 | Schilling | June 28, 1960 |